(12) United States Patent
Hapka

(10) Patent No.: US 9,358,882 B2
(45) Date of Patent: Jun. 7, 2016

(54) DEFAULT OPEN DIFFERENTIAL CONTROL SWITCH

(71) Applicant: Polaris Industries Inc, Medina, MN (US)

(72) Inventor: Roger J. Hapka, Andover, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/470,264

(22) Filed: Aug. 27, 2014

(65) Prior Publication Data

US 2014/0367185 A1    Dec. 18, 2014

Related U.S. Application Data

(63) Continuation of application No. 13/325,561, filed on Dec. 14, 2011, now Pat. No. 8,827,025.

(60) Provisional application No. 61/423,915, filed on Dec. 16, 2010.

(51) Int. Cl.
*B60K 23/04* (2006.01)
*B60K 17/354* (2006.01)
*B60T 1/02* (2006.01)

(52) U.S. Cl.
CPC ............... *B60K 23/04* (2013.01); *B60K 17/354* (2013.01); *B60T 1/02* (2013.01); *B60K 2023/046* (2013.01)

(58) Field of Classification Search
CPC .. B60K 23/08; B60K 2023/085; B60K 17/34; B60K 17/348; B60K 17/35; B60K 17/3505

USPC ................................ 180/233, 245, 247–250
See application file for complete search history.

(56) References Cited

U.S. PATENT DOCUMENTS

| | | | |
|---|---|---|---|
| 2,874,790 A | 2/1959 | Hennessey | |
| 4,347,760 A | 9/1982 | Jewett | |
| 4,462,271 A | 7/1984 | Stieg | |
| 4,570,509 A | 2/1986 | Nighswonger | |
| 5,036,940 A | 8/1991 | Takemura | |
| 5,373,912 A | 12/1994 | Haiki et al. | |
| 6,001,041 A * | 12/1999 | Sawase et al. | 475/198 |
| 6,820,712 B2 * | 11/2004 | Nakamura | 180/249 |
| 7,211,019 B2 * | 5/2007 | Kirkwood et al. | 475/205 |
| 7,220,209 B1 | 5/2007 | Dahl et al. | |
| 7,291,094 B2 * | 11/2007 | Heier et al. | 477/174 |
| 7,549,941 B2 * | 6/2009 | Boddy | 475/231 |
| 7,690,468 B2 | 4/2010 | Nozaki et al. | |

(Continued)

FOREIGN PATENT DOCUMENTS

WO    WO 2005/038987 A2    4/2005

OTHER PUBLICATIONS

International Search Report issued by the European Patent Office, dated Apr. 10, 2012, for International Application No. PCT/US2011/064656; 3 pages.

(Continued)

*Primary Examiner* — Joseph Rocca
*Assistant Examiner* — Michael Stabley
(74) *Attorney, Agent, or Firm* — Faegre Baker Daniels LLP

(57) ABSTRACT

A vehicle is described having plural modes of operation for the front and rear differential and whereupon start-up of the vehicle, the front and rear differentials are opened to their most open position.

20 Claims, 17 Drawing Sheets

(56) References Cited

U.S. PATENT DOCUMENTS

| | | | |
|---|---|---|---|
| 7,845,452 B2 | 12/2010 | Bennett | |
| 2002/0070066 A1* | 6/2002 | Nakamura | 180/249 |
| 2005/0266953 A1* | 12/2005 | Puiu | 475/205 |
| 2006/0102407 A1 | 5/2006 | Berthiaume | |
| 2007/0235242 A1 | 10/2007 | Nozaki et al. | |
| 2009/0211830 A1* | 8/2009 | Kato et al. | 180/244 |
| 2010/0262347 A1* | 10/2010 | Murota et al. | 701/69 |
| 2010/0298082 A1 | 11/2010 | Dayton | |

OTHER PUBLICATIONS

Written Opinion issued by the European Patent Office, dated Apr. 10, 2012, for International Application No. PCT/US2011/064656; 6 pages.

International Preliminary Report on Patentability issued by the International Bureau of WIPO, dated Jun. 18, 2013, for International Application No. PCT/US2011/064656; 7 pages.

Search Report issued by the European Patent Office, dated May 11, 2015, for European Application No. 14194771.3; 7 pages.

* cited by examiner

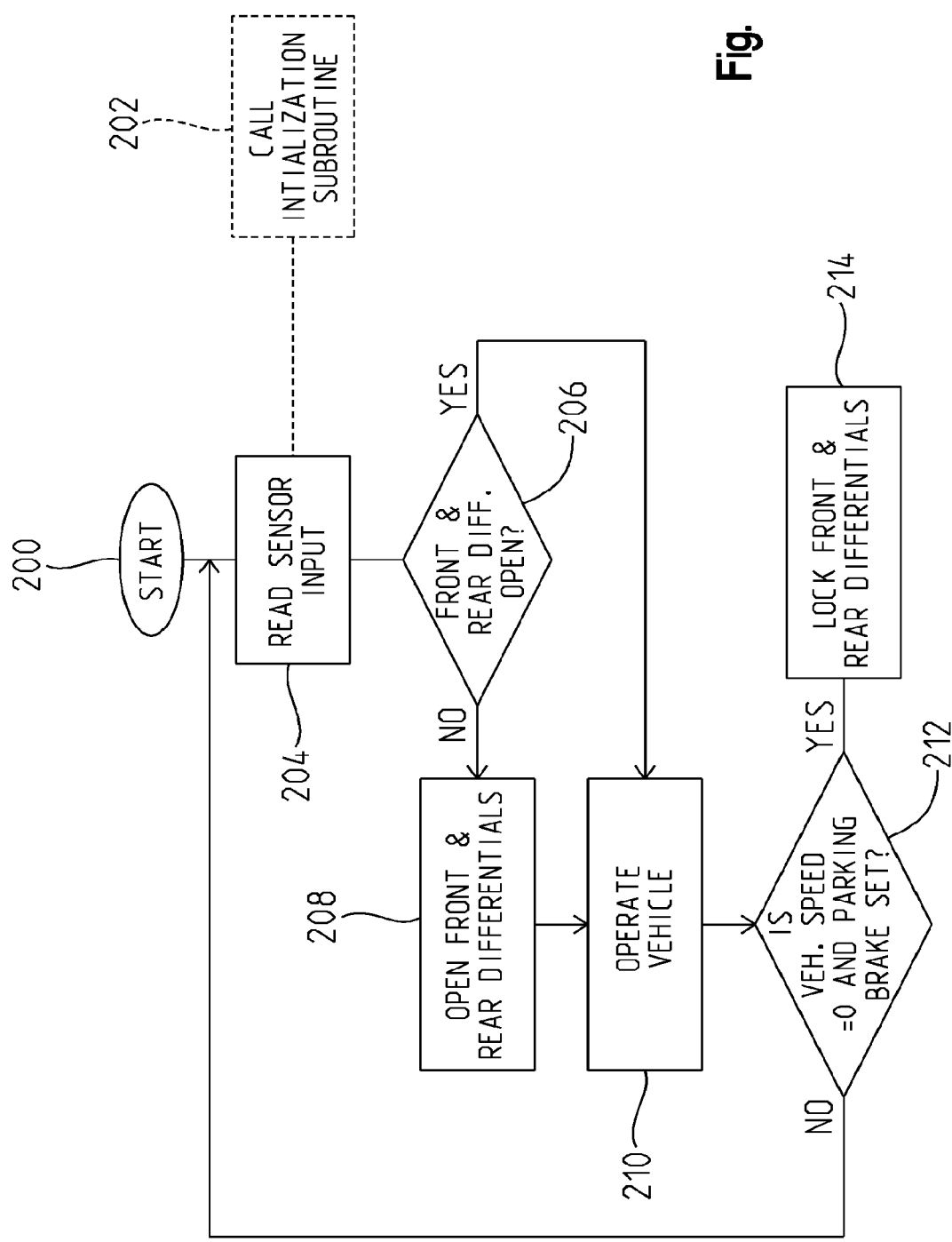

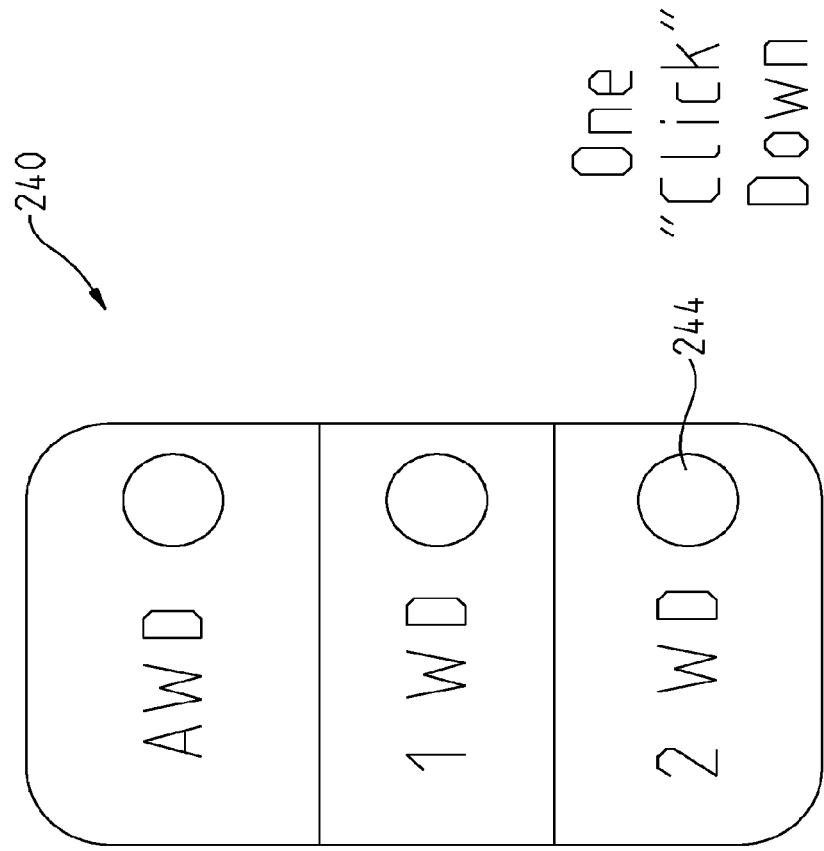

DEFAULT OPEN DIFFERENTIAL CONTROL SWITCH

PRIORITY

The present application is a continuation of and claims priority to U.S. patent application Ser. No. 13/325,561 titled DEFAULT OPEN DIFFERENTIAL CONTROL SWITCH filed Dec. 14, 2011 which is a non-provisional application of U.S. Provisional Patent Application Ser. No. 61/423,915 titled DEFAULT OPEN DIFFERENTIAL CONTROL SWITCH filed Dec. 16, 2010. The disclosures of which are expressly incorporated herein by reference.

BACKGROUND

The subject disclosure relates to an all terrain vehicle, and more particularly to one having a default setting for the front and rear differentials.

Oftentimes, all terrain vehicles have front and rear differentials coupled to a transmission, with multiple settings of the differentials on the vehicle, between: rear differential disengaged, differential engaged with both rear wheels locked or with limited slip, or both differentials engaged and locked. Multiple riders may have access to the vehicles, with no awareness of the present state of the differentials.

SUMMARY

In one embodiment described herein, a vehicle comprises a frame; front and rear ground engaging members supporting the frame; a propulsion unit supported by the frame; a transmission motively coupled to the propulsion unit; a front differential coupled to the transmission and to the front ground engaging members; a rear differential coupled to the transmission and to the rear ground engaging members; where the front and rear differentials are selectively locked or unlocked to provide various performance modes for the vehicle, and the front and rear differentials being controllably unlocked upon a certain vehicle signal.

In another embodiment described herein, a motor vehicle having a multimode traction system is described. The vehicle comprises a pair of rear wheels and a pair of steerable front wheels. A propulsion unit is provided for generating torque to drive the wheels, and a control unit includes programming therein for operating the propulsion unit. A rear differential is operatively connected with a rear drive train and supplying torque from the propulsion unit to the rear wheels, the rear differential including a lock for locking the rear differential. A front differential is operatively connected within a front drive train and selectively supplies torque from the propulsion unit to the front wheels, the front differential including a lock for locking the front differential. An ignition switch is electrically coupled to the control unit, the ignition switch having a first position and a second position; the ignition switch causing a first signal to be sent to the control unit when the ignition switch is moved from the second position to the first position, the ignition switch causing a second signal to be sent to the control unit when the ignition switch is moved from the second position to the first position; wherein the control unit responds to receiving the first signal by emitting signals to cause unlocking of both the front and rear differentials.

BRIEF DESCRIPTION OF THE DRAWINGS

FIG. 10 is a flow chart of the operation of the vehicle;

FIGS. 11A-11C show a first embodiment of the actuator device; and

DETAILED DESCRIPTION OF THE EMBODIMENT

Figure 1:
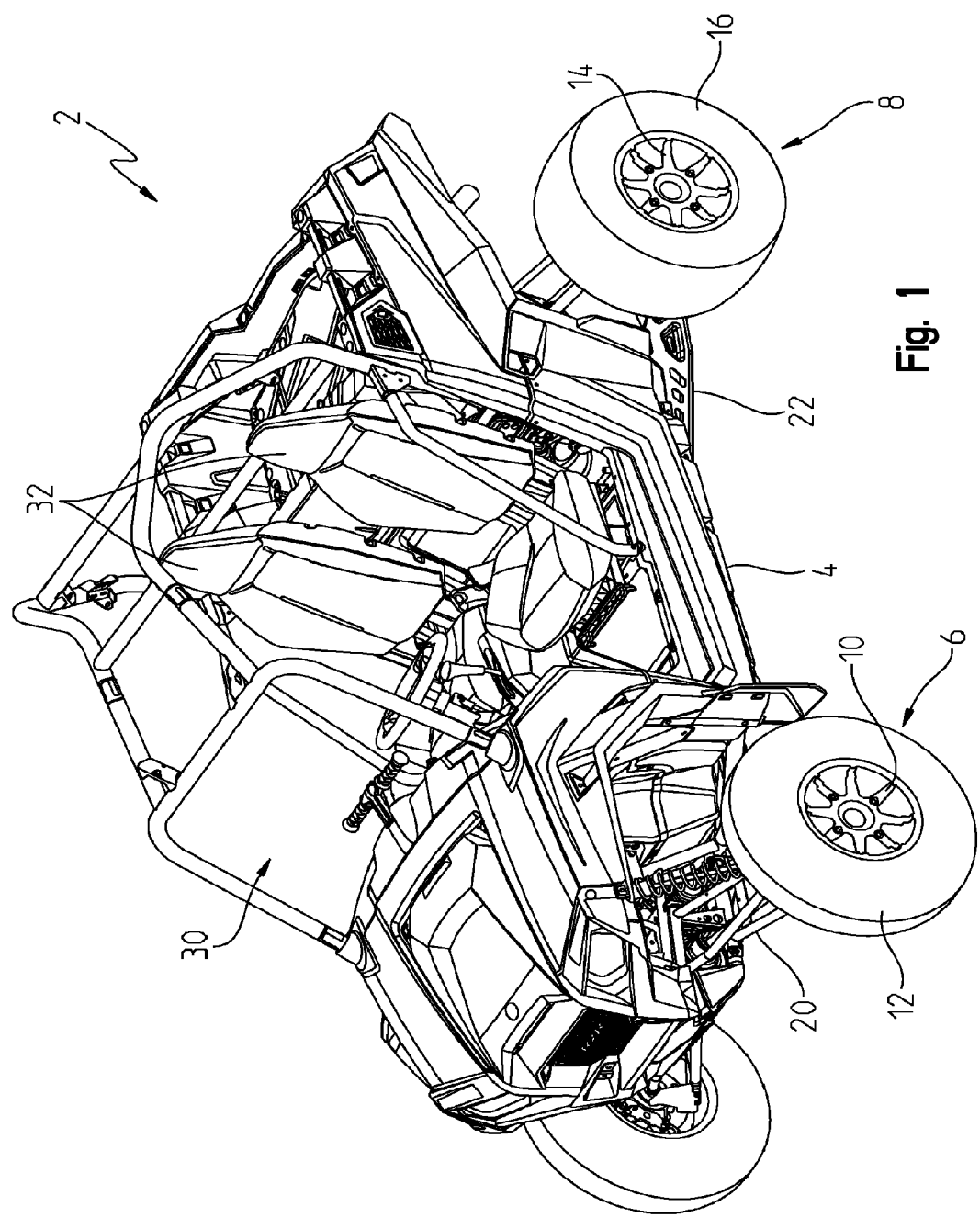
FIG. 1 is a front perspective view of a utility vehicle of the subject disclosure.
Figure 2:
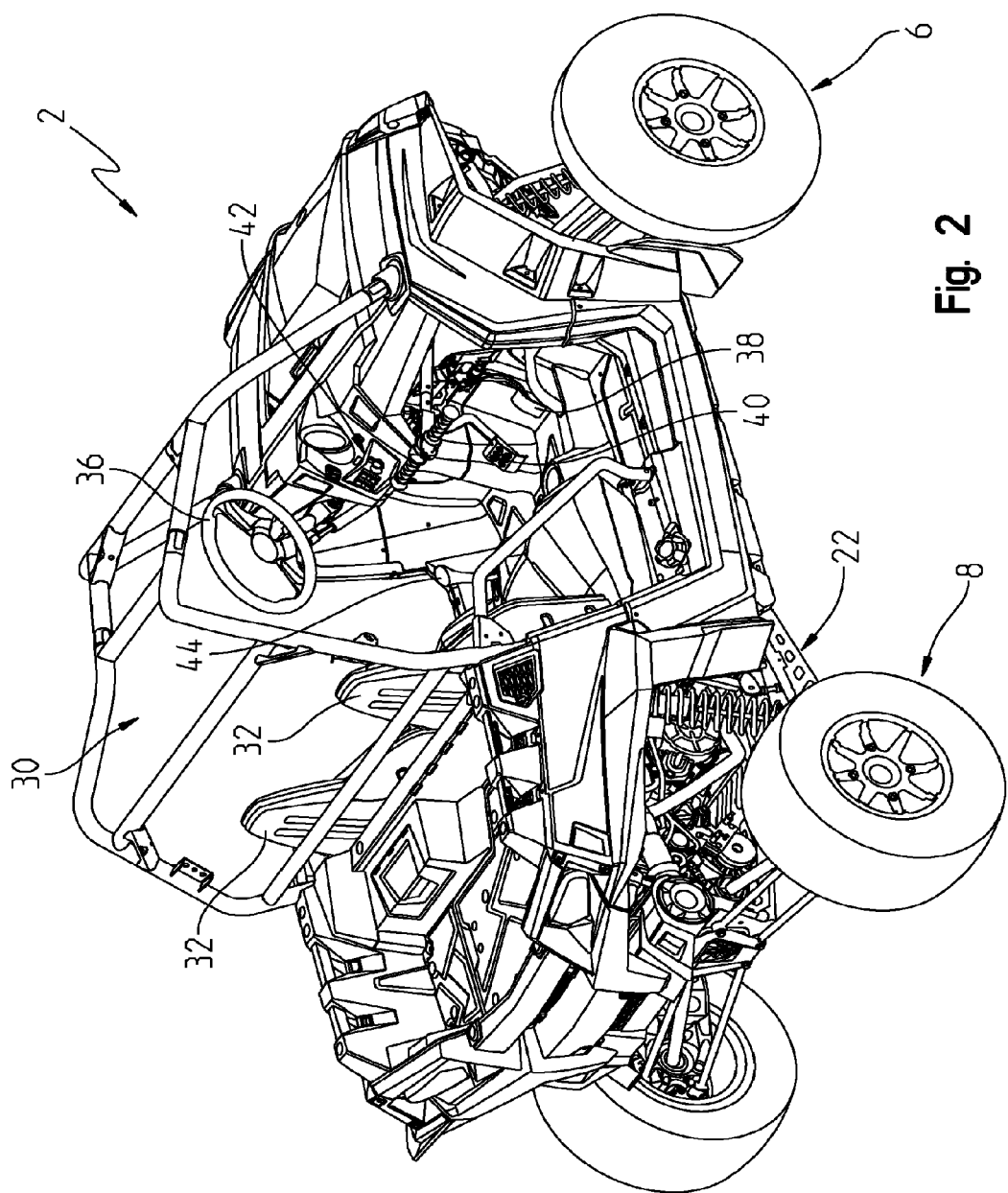
FIG. 2 is a rear perspective view of a utility vehicle according to the present disclosure.
Figure 3:
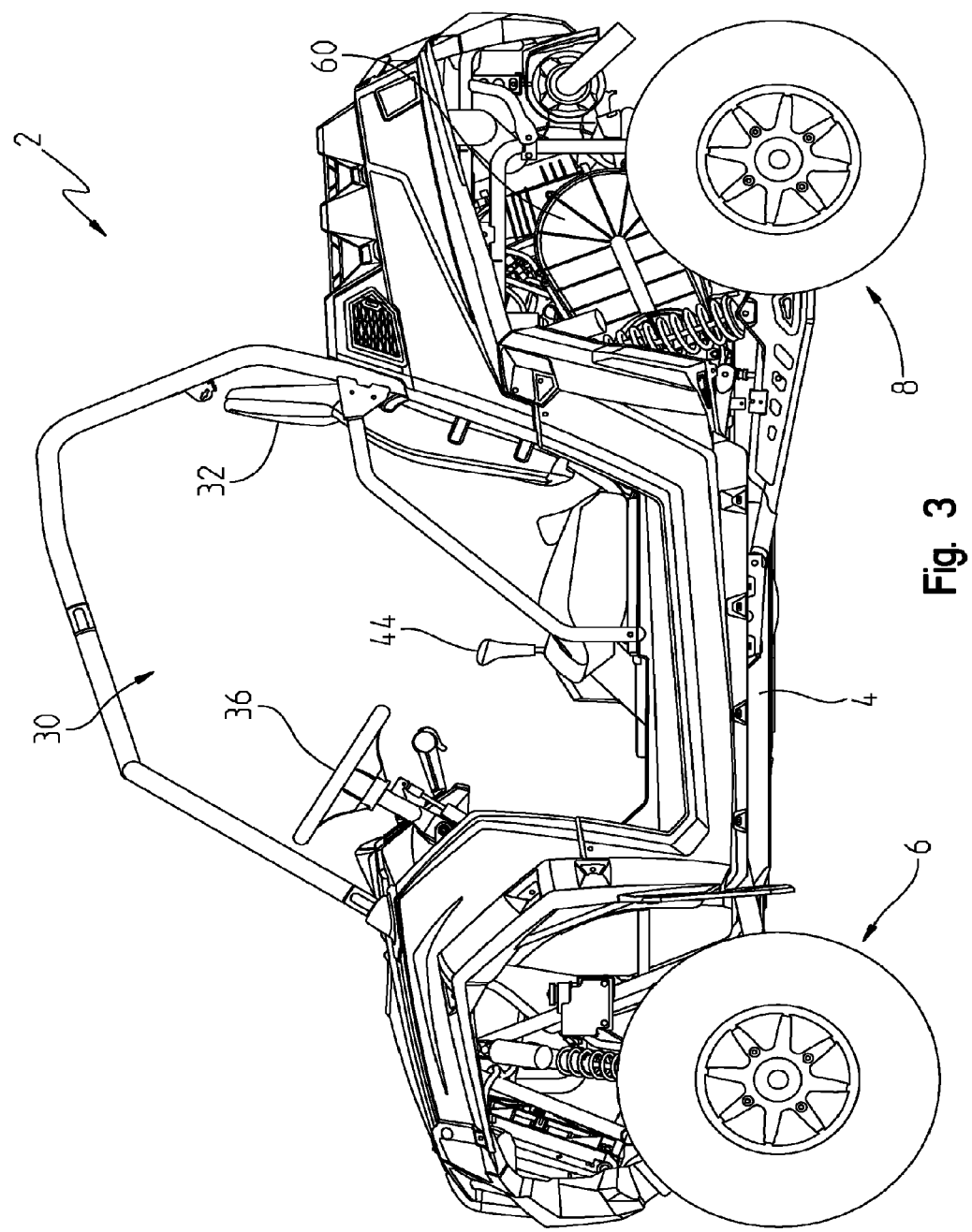
FIG. 3 is a left side view of the vehicle of FIG. 1.

With reference first to FIG. 1, an all terrain vehicle is shown at 2 in the form of a side-by-side vehicle. Vehicle 2 generally includes a frame 4 supported by front and rear ground engaging members 6, 8, comprised of front wheels 10, front tires 12, and rear wheels 14 and rear tires 16. Front ground engaging members 6 are attached to frame 4 by way of suspension 20 whereas rear ground engaging members 8 are attached to frame 4 by way of suspension 22. An operator's area is defined in the center of the vehicle and shown generally at 30. Operator's area is comprised of side-by-side seats 32 which are coupled to frame 4 as known in the art. As shown in FIGS. 2 and 3, operator's area 30 further comprises operation controls in the form of steering wheel 36, accelerator pedal 38, brake pedal 40, instrument cluster 42 and transmission shift lever 44.

Figure 4:
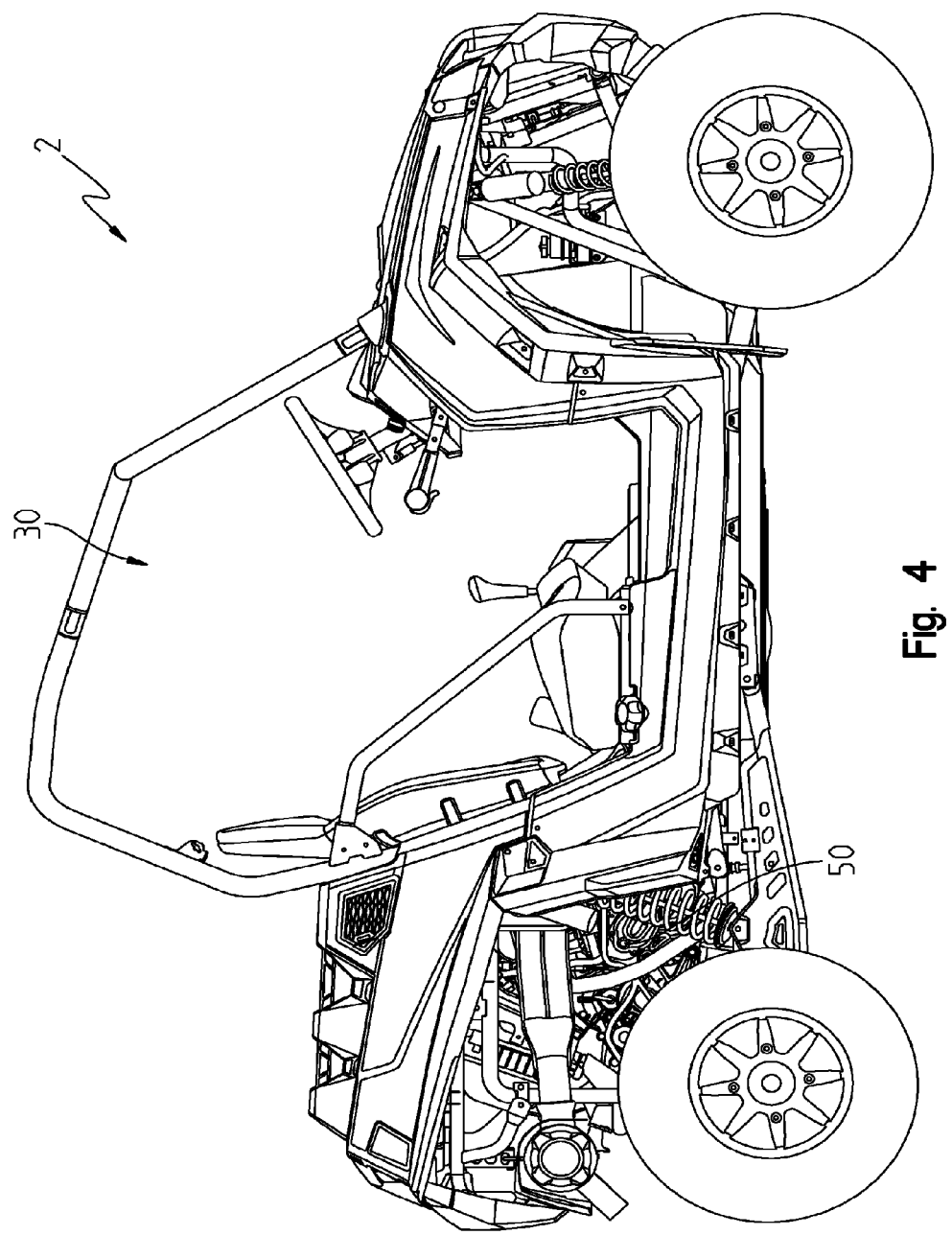
FIG. 4 is a rear side view of the vehicle of FIG. 1.
Figure 5:
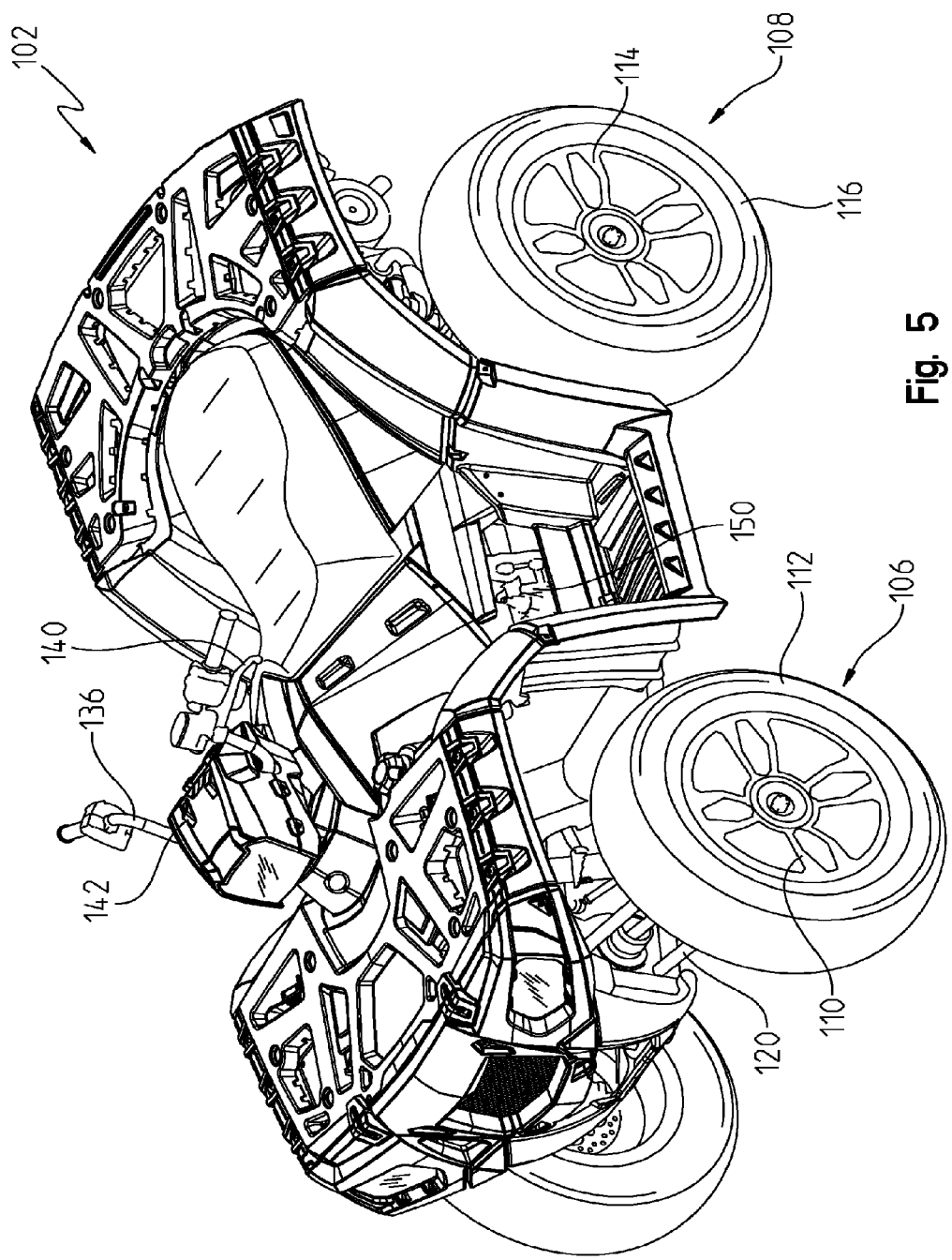
FIG. 5 is a front perspective view of a straddle-type vehicle of the present disclosure.

With reference now to FIGS. 3 and 4, vehicle 2 includes a propulsion unit 50 and a transmission unit 60 (FIG. 3) including a continuously variable transmission (CVT) as described herein. As vehicle 2 is a four wheel drive or all wheel drive unit, vehicle 2 would include a front and rear differential as described herein coupled to engine 50 and transmission 60 for propelling the front and rear ground engaging members 6, 8. The construction of the drivetrain could be similar to that shown in U.S. Pat. No. 7,819,220, the subject matter of which is incorporated herein by reference.

Figure 6:
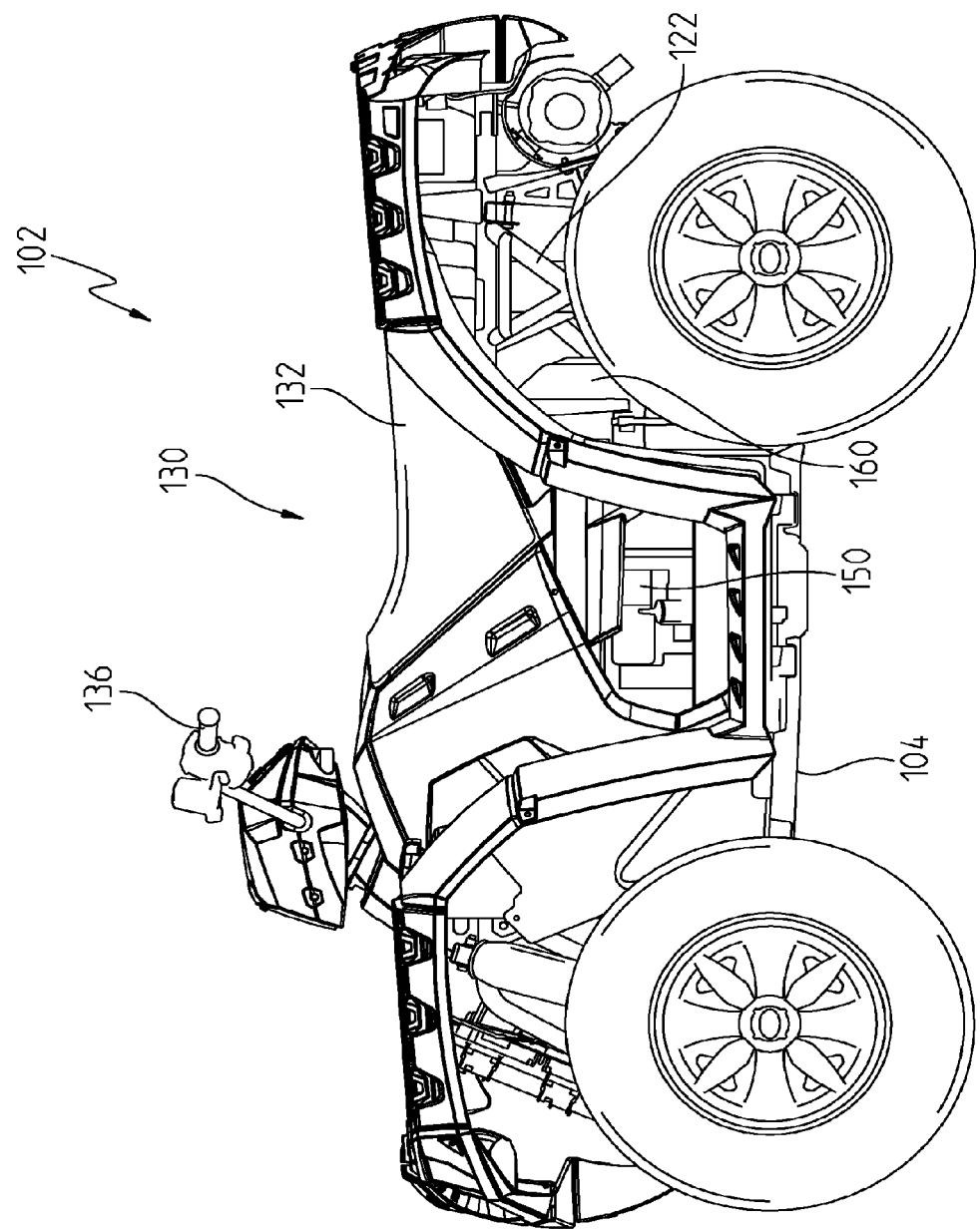
FIG. 6 is a left side view of the vehicle of FIG. 5.
Figure 7:
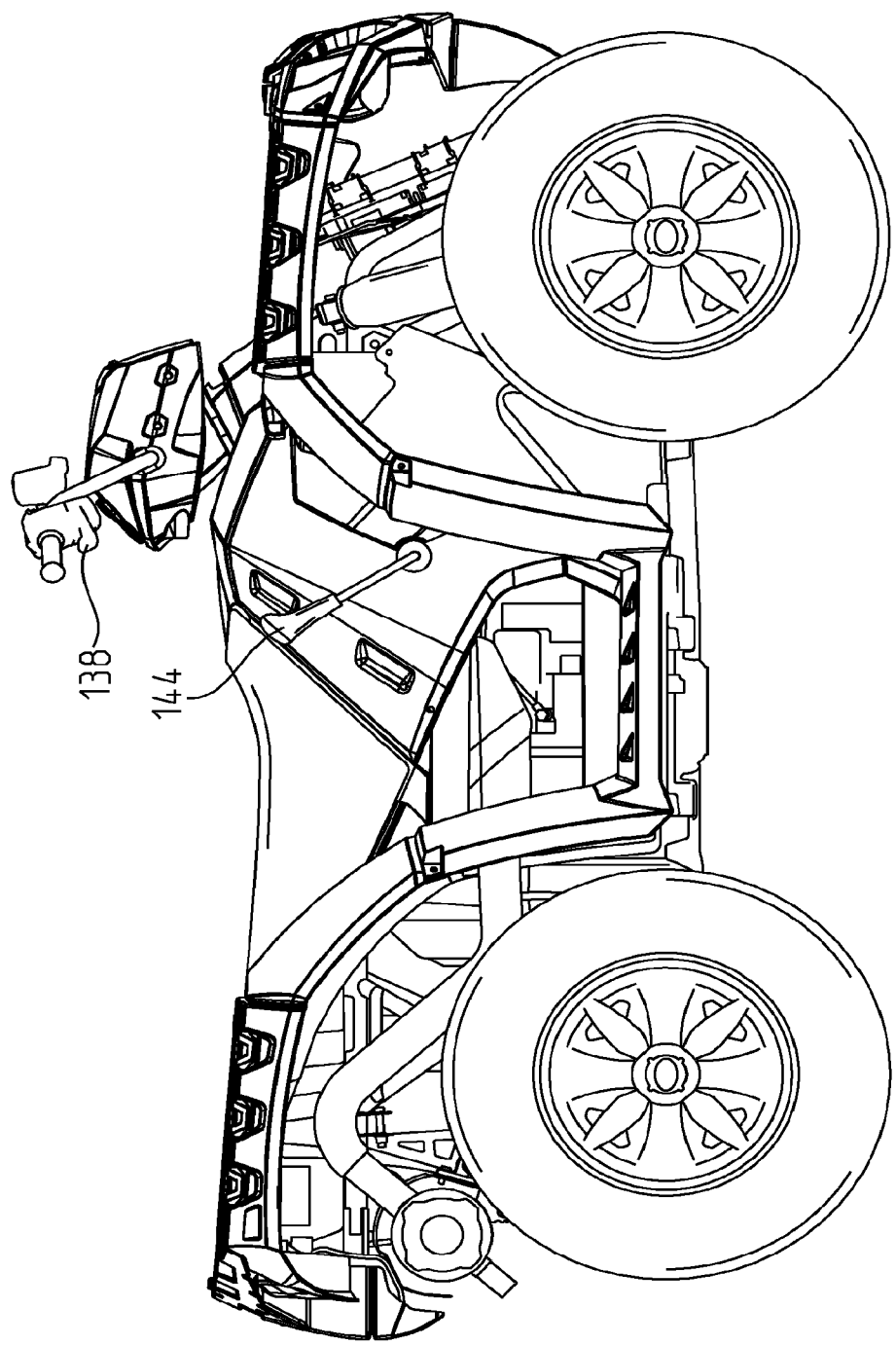
FIG. 7 is a right side view of the vehicle of FIG. 5.
Figure 8:
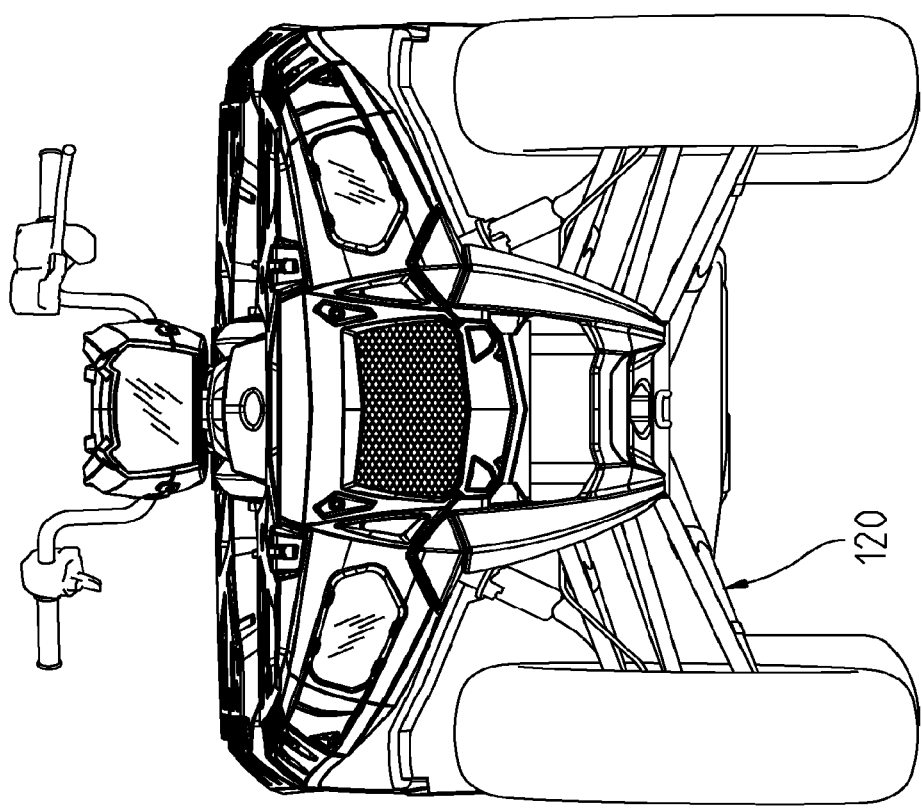
FIG. 8 is a front view of the vehicle of FIG. 5.

With reference now to FIGS. 5-8, the vehicle could be in the form of a straddle-type vehicle as shown at 102 having a frame 104 (FIG. 6) and front and rear ground engaging members 106, 108 defined by wheels 110, tires 112 and wheels 114 and tires 116. Vehicle 102 further includes a front suspension 120 and a rear suspension 122 (FIG. 6). Operator's area 130 is comprised of straddle seat 132, a steering mechanism in the form of handlebars 136, an accelerator in the form of a pull lever 138 (FIG. 7), at least one brake mechanism in the form of a lever 140 (FIG. 5), instrument cluster 142, and a transmission shift lever 144 (FIG. 7). In addition, vehicle 102 includes propulsion unit 150 and transmission 160 (FIG. 6). In a like manner to vehicle 2, vehicle 102 is a four wheel drive or all wheel drive vehicle having a front and rear differential as described herein. The construction of the drivetrain of vehicle 102 could be similar to that shown and described in U.S. Pat. No. 7,845,452, the subject matter of which is incorporated herein by reference.

In one embodiment, propulsion unit 50 or 150 is a typical combustion engine, but could also comprise a multifuel engine capable of utilizing various fuels. Exemplary engines are disclosed in U.S. patent application Ser. No. 11/445,731, filed Jun. 2, 2006, the disclosure of which is expressly incorporated by reference herein. In another embodiment, engine 50/150 is a hybrid electric engine, while in another embodiment, engine 50/150 is a hybrid electric drive engine. In addition, the propulsion unit need not have an engine at all, but could be all electric, for example similar to that disclosed in U.S. patent application Ser. Nos. 12/484,921, 12/816,0004, 12/816,095, 12/816,052, or 12/815,907, the subject matter of which is incorporated herein by reference.

Figure 9:
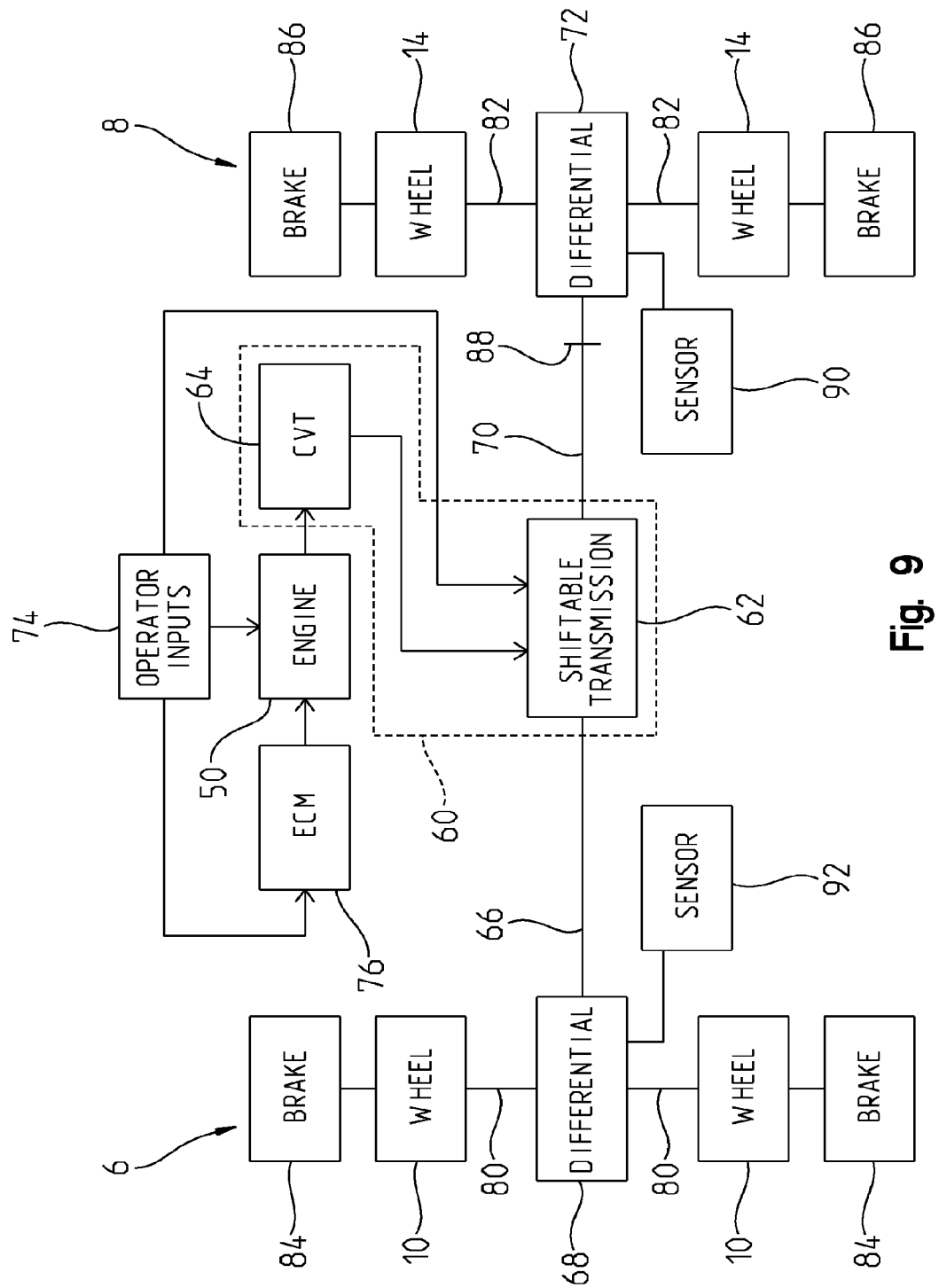
FIG. 9 is a schematic of the drivetrain of the present disclosure.
Figure 11A:
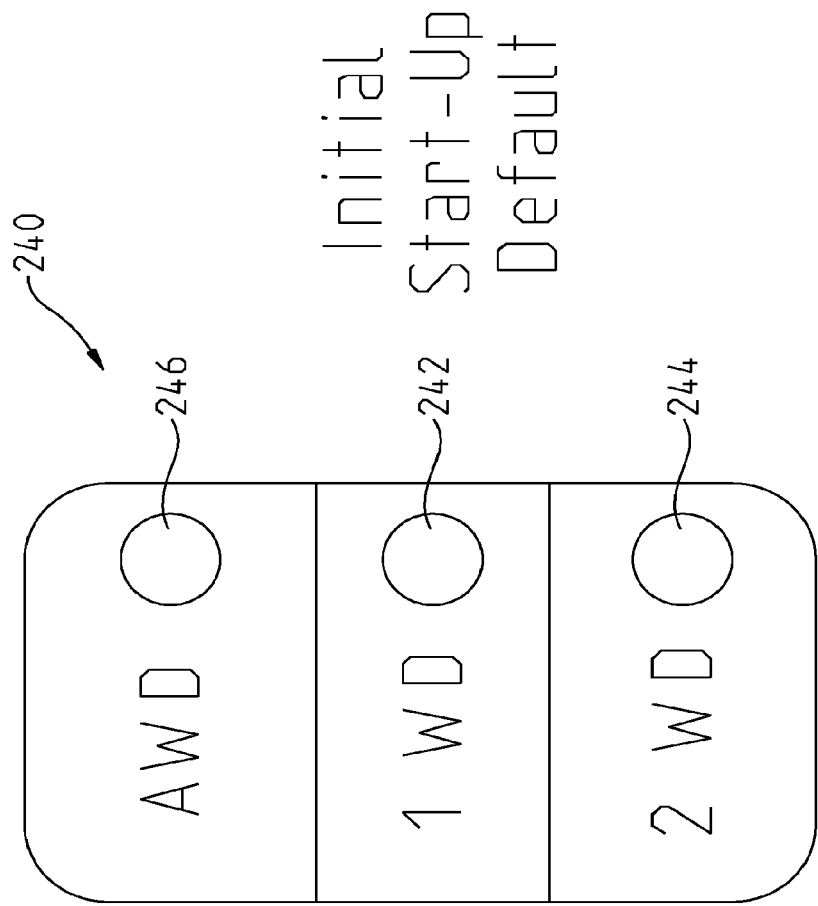
Figure 11C:
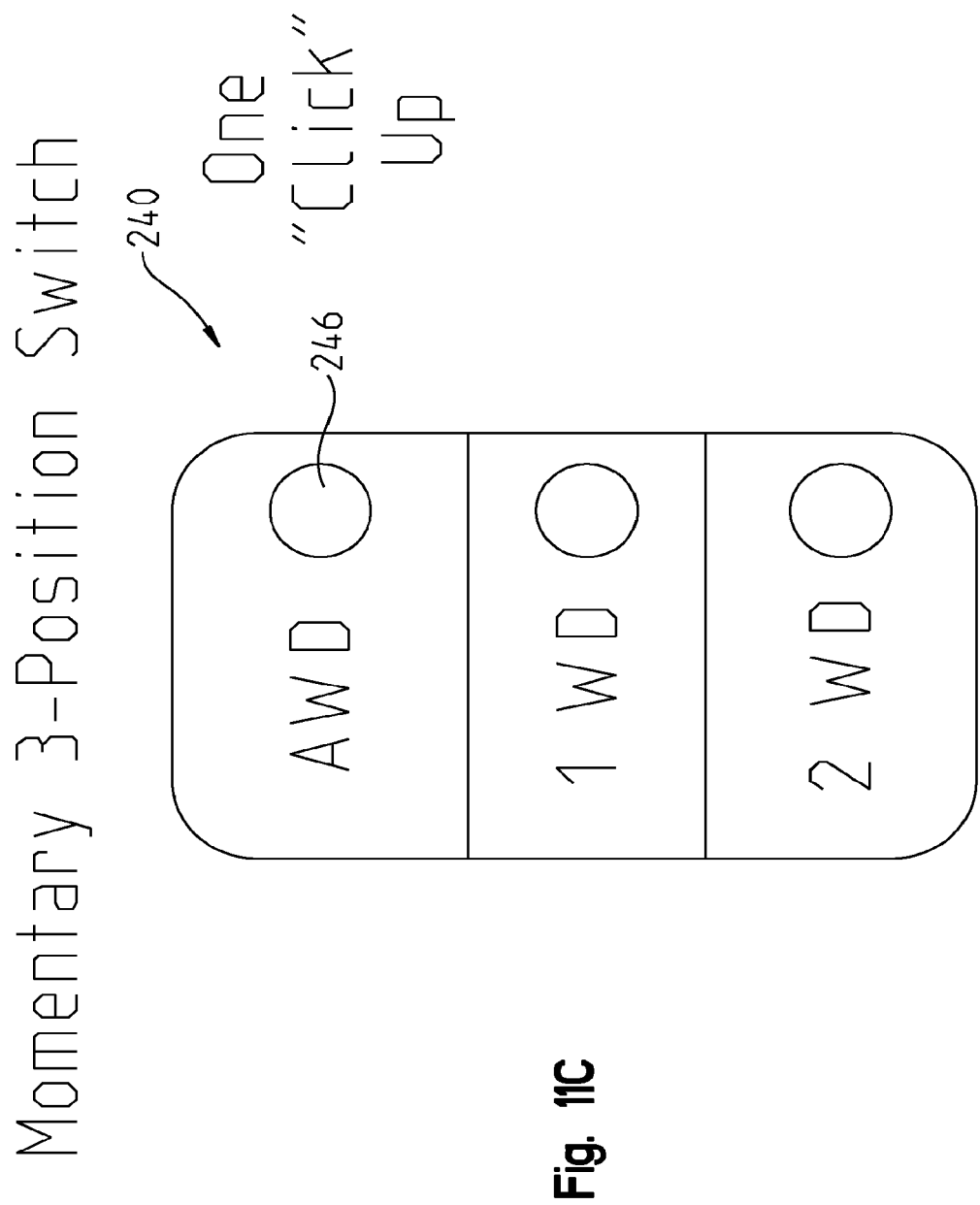

With reference now to FIG. 9, the drivetrain of vehicle 2 (or 102) will be described in greater detail, and is described as including an engine. In one embodiment, transmission 60 or 160 includes a shiftable transmission 62 and a continuously variable transmission ("CVT") 64. CVT 64 is coupled to engine 50 and shiftable transmission 62. Shiftable transmission 62 is coupled to drive shaft 66 which in turn is coupled to front differential 68 and to drive shaft 70 coupled to rear differential 72.

Shiftable transmission 62 is shiftable between a high gear for normal forward driving, a low gear for towing, a reverse gear for driving in reverse, and a park setting which locks the output drive of the shiftable transmission from rotating. Exemplary shiftable transmissions and CVTs are disclosed in U.S. Pat. No. 6,725,962 and U.S. Pat. No. 6,978,857, the disclosures of which are expressly incorporated by reference herein.

The operation of engine 50 and transmission 60 is controlled through an operator input 74 (such as transmission control 44 or as further described herein) and an electrical control module ("ECM") 76. ECM 76 has software to control the operation of engine 50 and transmission 60 based on operator inputs 74, and sensors which monitor engine 50 and software to control the operation of differentials 68 and 72. It should be understood that differential 68 is interconnected to wheels 10 by way of front stub shafts 80, and that rear differential 72 is coupled to rear wheels 14 by way of rear stub shafts 82. It should be further appreciated that the front wheels and rear wheels include brakes 84 and 86.

Various configurations of front differential 68 and rear differential 72 are contemplated. Regarding front differential 68, in one embodiment front differential 68 has a first configuration wherein power is provided to both of the wheels of front axle 80 and a second configuration wherein power is provided to one of the wheels of axle 80, such as the wheel having the less resistance relative to the ground.

In one embodiment, front differential 68 may also include active descent control ("ADC"). ADC is an all wheel drive system that provides on-demand torque transfer to the front wheels with a front drive and is also capable of providing engine braking torque to the front wheels with a back drive. Both the front drive and the back drive are portions of front differential 68 and may be active or inactive. In the case of the front drive, when active, power is provided to both of the wheels of front axle 80 and, when inactive, power is provided to one of the wheels of front axle 80. In the case of the back drive, when active, engine braking is provided to the wheels of front axle 80 and, when inactive, engine braking is not provided to the wheels of front axle 80.

Regarding rear differential 72, in one embodiment rear differential 72 is a locked differential wherein power is provided to both of the wheels of axle 82, rear differential 72 may be a lockable/unlockable differential relative to output shafts 82. When rear differential 72 is in a locked configuration power is provided to both wheels of axle 82. When rear differential 72 is in an unlocked configuration, power is provided to one of the wheels of axle 82, such as the wheel having the less resistance relative to the ground. Front and rear brakes 80, 82 are connected to front and rear wheels 10, 14 as is known in the art. A parking brake 88 may also be connected in drive shaft 70.

It is contemplated that the front differential 68 and rear differential 72 are spring-loaded dog clutches which are solenoid operated. When power is applied to the solenoid, the clutches are opened whereas when the power is turned off to the solenoid, the clutches are spring biased to lock up. Sensors 90 and 92 monitor the condition of the differentials 68 and 72 which in the present embodiment sends the power to the differential clutch solenoids. With reference now to FIG. 10, the operation of the vehicle and the differentials will be described in greater detail.

As shown in step 200, an operator would turn an ignition key into the first or "On" position which first causes logic in the ECM 76 to be uploaded, see step 202. At step 204, sensors 90 and 92 are read to determine the condition and position of the front 68 and rear 72 differentials. At step 206, the condition of the front and rear differentials is determined by querying whether the front and rear differential are open and unlocked. If they are not, step 208 is activated providing a signal to the differential solenoids to open the spring-loaded clutches as described above. As shown in FIG. 10, the vehicle may now be operated at step 210. The ignition switch could have more than two positions, for example in some vehicles there are three positions where the third position is to activate the headlights.

Other steps during the operation of the vehicle include step 212 which queries whether the vehicle speed is equal to 0 and the parking brake set, and if yes, step 214 is activated to lock the front and rear differentials.

In the particular embodiment described, the front and rear differentials are locked at shutdown when the ignition key is moved to the second and "Off" position, due to the parking brake 88 being positioned within driveshaft 70. Thus it is preferable to lock the differentials when the vehicle is shut down so that the parking brake 88 properly functions with a locked driveshaft 70. However on startup, the front and rear differentials are opened to their most open position as described above with reference to FIG. 10. It should be noted that if the parking brake is not on a drive shaft, that the front and rear differentials could be opened to their most open position at vehicle shut-down.

The differentials could be unlocked by a certain vehicle signal, for example from the ECU, or the reverse logic could be implemented where the default is open and a certain vehicle signal would be required to lock the differentials.

Finally with respect to FIGS. 11A-11C and 12A-12D, the actuation of the differential settings will be described. With respect first to FIG. 11A, a three position momentary switch may be provided within instrument cluster 42 whereby upon initial startup, the default of the differentials provides for the rear differential to be in the open position such that light 242 is illuminated. With respect to FIG. 11B, the momentary switch may be clicked down to illuminate light 244 to show that the vehicle is in the two wheel drive mode or having the rear differential locked. With respect to FIG. 11C, the switch 240 may be clicked upwardly with light 246 to show an all wheel drive mode with both the front and rear differentials locked.

Figure 12A:
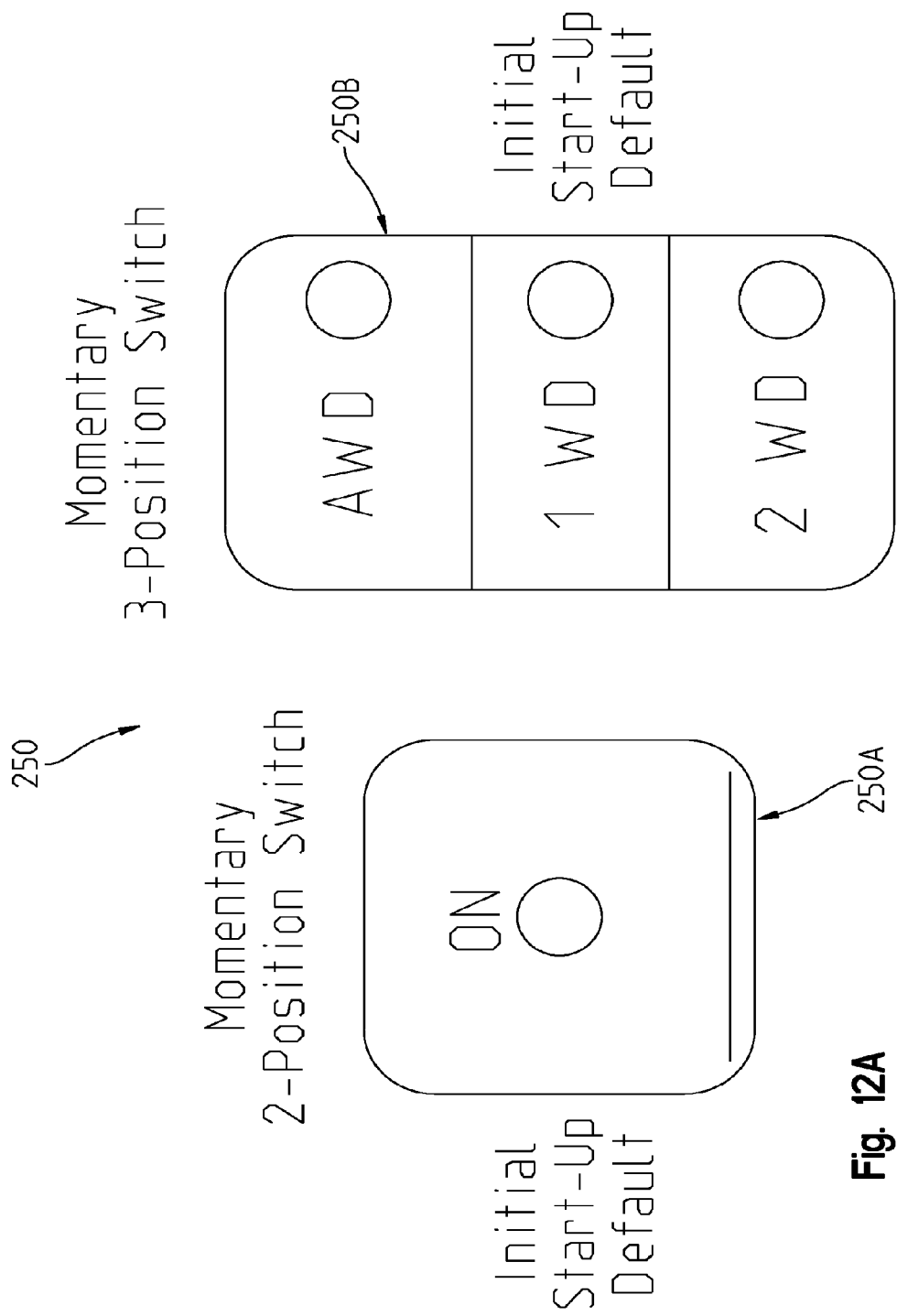
FIGS. 12A-12D show a second embodiment of the actuator device.
Figure 12B:
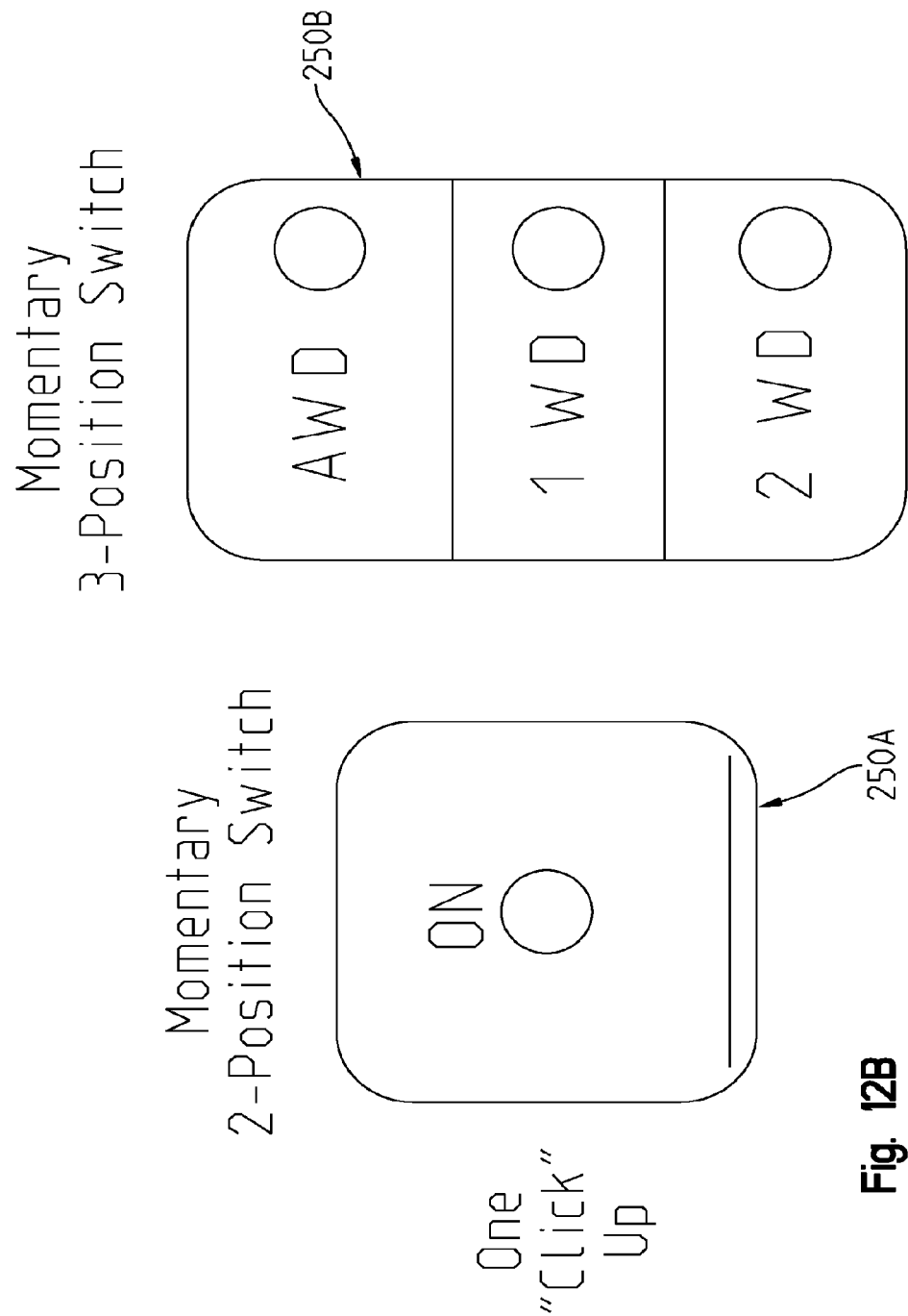
Figure 12C:
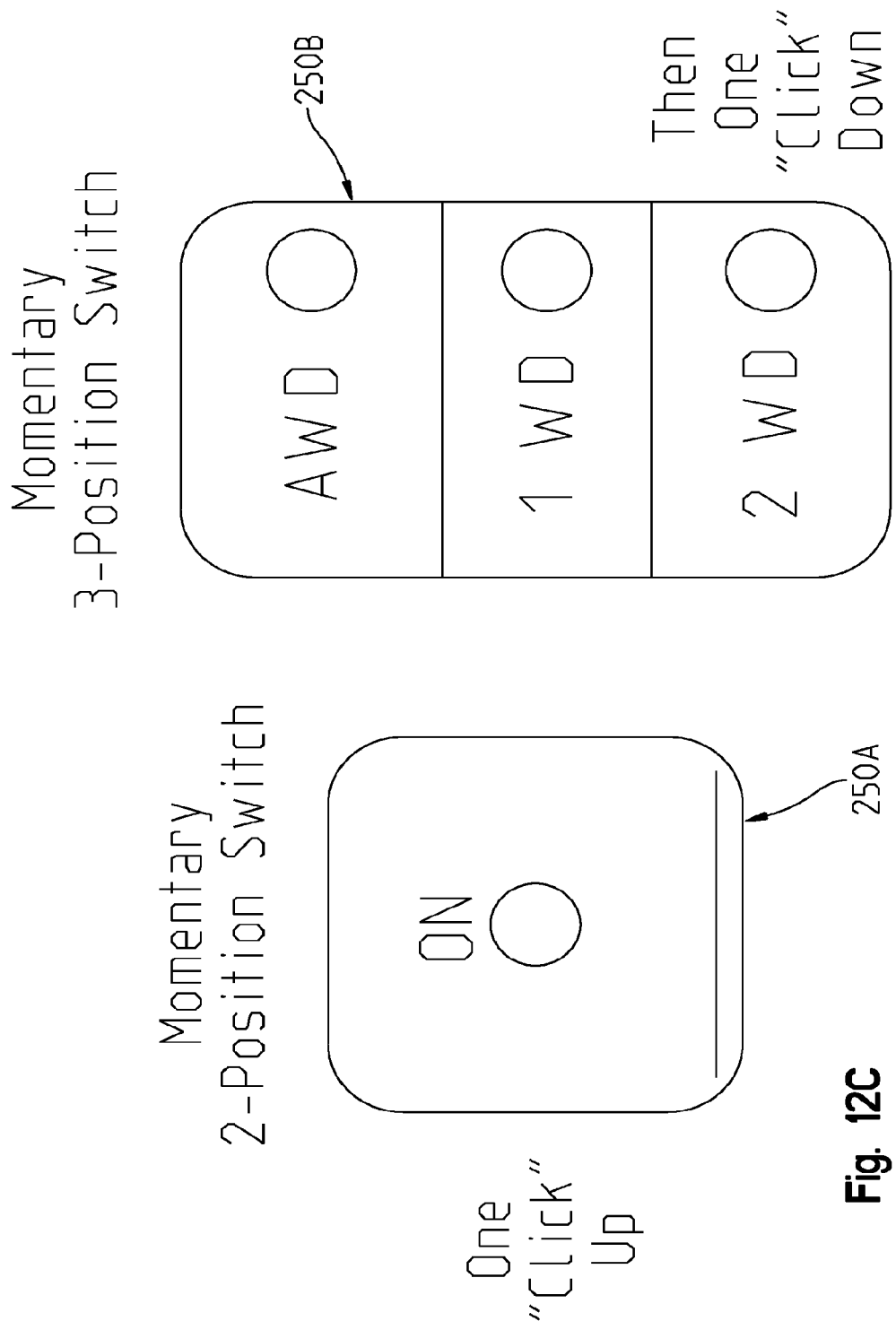
Figure 12D:
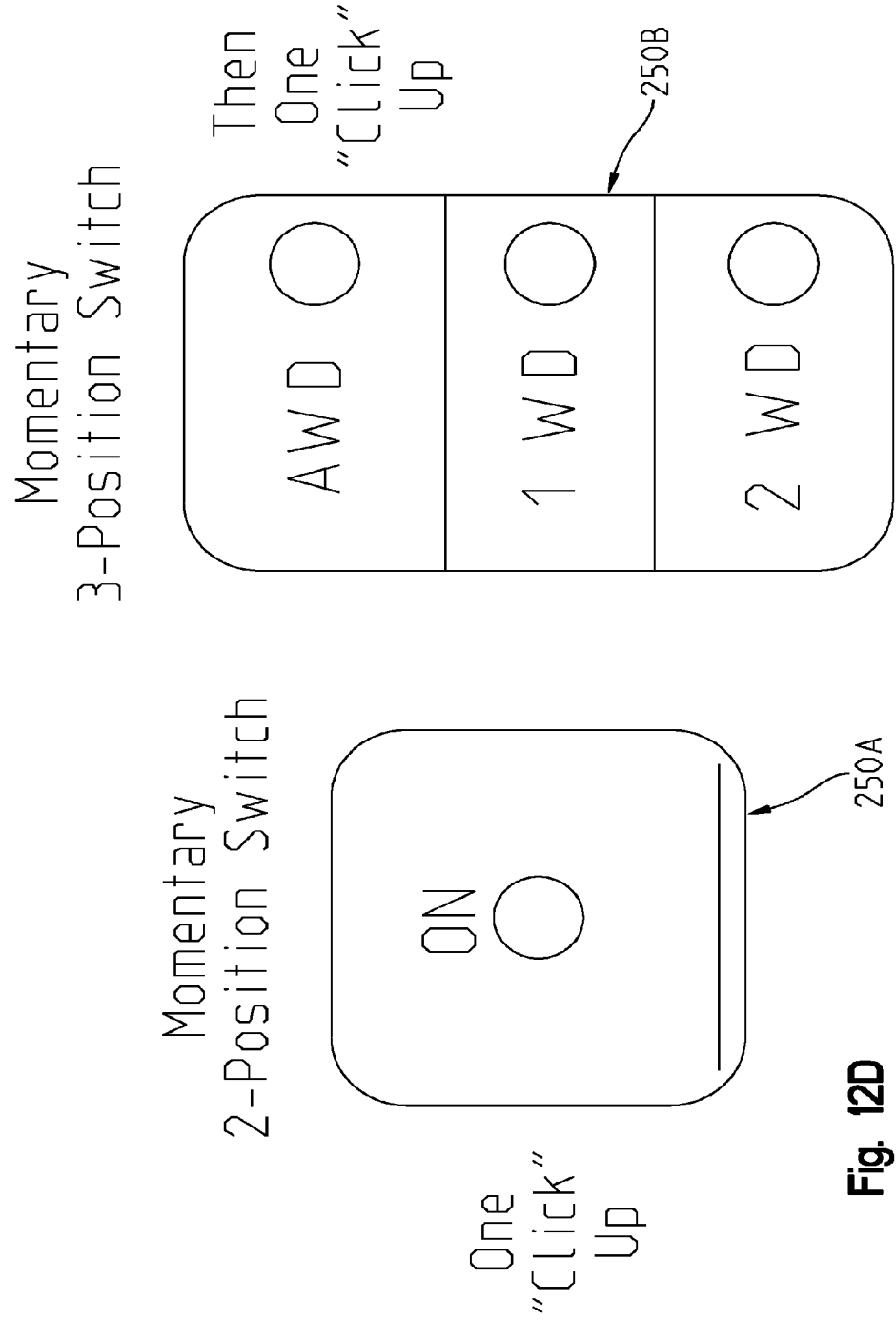

With respect now to FIG. 12A, a second embodiment 250 may be shown with a momentary two position switch 250a and a momentary three position switch 250b. FIG. 12B shows the two position switch activated setting the differential and the one wheel drive configuration. FIG. 12C shows a one click down position of the momentary switch 250b showing the two wheel drive mode and FIG. 12D shows the one click up mode of momentary switch 250*b* showing the all wheel drive mode.

The invention claimed is:

1. A vehicle, comprising:
   a frame;
   front and rear ground engaging members supporting the frame;
   a propulsion unit supported by the frame;
   a transmission motively coupled to the propulsion unit;
   at least one differential selected from 1) a front differential driven by the transmission and driving the front ground engaging members and 2) a rear differential driven by the transmission and driving the rear ground engaging members;
   an electronic engine control unit for operating the propulsion unit;
   the at least one differential being selectively locked or unlocked to provide various performance modes for the vehicle responsive to signals received from the electronic engine control unit;
   a differential switch having a plurality of states, each state corresponding to a setting of at the least one differential, the differential switch in communication with the electronic engine control unit;
   an ignition, the at least one differential being controllably locked or unlocked by the engine control unit responsive to a first signal indicative of a change in the state of the ignition, the engine control unit controlling the at least one differential responsive to the first signal regardless of a setting of the differential switch.

2. The vehicle of claim 1, wherein the at least one differential is locked responsive to an indication that the state of the ignition switch is changed to an "off" state.

3. The vehicle of claim 1, wherein the at least one differential is unlocked responsive to an indication that the state of the ignition switch is changed from an "off" state to an "on" state.

4. The vehicle of claim 1, wherein a first performance mode is invoked responsive to one of vehicle startup and vehicle shutdown.

5. The vehicle of claim 4, wherein the at least one differential is locked responsive to vehicle shutdown.

6. The vehicle of claim 4, wherein the at least one differential is unlocked responsive to vehicle startup.

7. The vehicle of claim 1, wherein the at least one differential includes the front differential and the rear differential.

8. The vehicle of claim 1, wherein the electronic engine control contains programming therein that dictates at least one setting of the at least one differential.

9. The vehicle of claim 1, wherein the electronic control unit interprets the first signal to override any setting indicated by the differential switch.

10. A vehicle, comprising:
    a frame;
    front and rear ground engaging members;
    a propulsion unit supported by the frame;
    a transmission motively coupled to the propulsion unit;
    at least one differential selected from 1) a front differential driven by the transmission and driving the front ground engaging member and 2) a rear differential driven by the transmission and driving the rear ground engaging member;
    a differential switch having first and second states that call for first and second states of the at least one differential;
    the vehicle having an operational mode and a non-operational mode;
    the vehicle providing that responsive to the vehicle being put in the operational mode, the at least one differential is unlocked, regardless of the current state of the differential switch.

11. The vehicle of claim 10, further comprising an ignition having an on mode, wherein placing the ignition in the on mode causes unlocking of the at least one differential.

12. The vehicle of claim 11, wherein placing the ignition switch into an off mode causes locking of the at least one differential.

13. The vehicle of claim 10, wherein the vehicle requires that the at least one differential is unlocked when the vehicle is placed in the operational mode.

14. The vehicle of claim 10, further including a parking brake coupled to the vehicle to provide braking to at least one of the front and rear ground engaging members.

15. An electronic control unit for a motor vehicle including:
    a differential control output port;
    a processor;
    a differential switch input port operable to receive differential control signal from a differential switch;
    memory containing instructions that when interpreted by the processor cause the processor to:
    determine when the motor vehicle is placed in an "on" mode and responsive thereto, provide that an output of the differential control output port provides for a differential of the vehicle to assume an unlocked state regardless of any input received via the differential switch input port.

16. The control unit of claim 15, wherein the instructions further cause the processor to determine when the motor vehicle is switched out of the "on" mode and responsive thereto, provide that an output of the differential control output port provides for a differential of the vehicle to assume a locked state.

17. The control unit of claim 15, wherein the determination that the motor vehicle is placed in the "on" mode includes a determination that an ignition switch is in an "on" mode.

18. The control unit of claim 15, wherein placement of the motor vehicle in the "on" mode results in unlocking of front and rear differentials.

19. An electronic control unit for a motor vehicle including:
    a differential control output port;
    a processor;
    memory containing instructions that when interpreted by the processor cause the processor to:
    determine when the motor vehicle is placed in an "on" mode and responsive thereto, provide that an output of the differential control output port provides for a differential of the vehicle to assume an unlocked state, and
    permit an output of the differential control output port to provide for the differential to assume a locked state after being initially automatically placed into the unlocked state upon placement of the vehicle into the "on" mode.

20. The control unit of claim 19, wherein the determination that the motor vehicle is placed in the "on" mode includes a determination that an ignition is transitioned from an "off" mode to an "on" mode.

* * * * *